US010891011B2

(12) United States Patent
Park et al.

(10) Patent No.: US 10,891,011 B2
(45) Date of Patent: Jan. 12, 2021

(54) TOUCH SENSOR HAVING SENSING ELECTRODES AND OPTICAL COMPENSATION PATTERNS AND IMAGE DISPLAY DEVICE INCLUDING THE SAME

(71) Applicant: DONGWOO FINE-CHEM CO., LTD., Jeollabuk-do (KR)

(72) Inventors: Sang Jin Park, Gyeonggi-do (KR); Do Hyoung Kwon, Gyeonggi-do (KR); Sung Jin Noh, Gyeonggi-do (KR); Han Tae Ryu, Chungcheongbuk-do (KR); Jun Gu Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 16/568,829

(22) Filed: Sep. 12, 2019

(65) Prior Publication Data
US 2020/0089372 A1    Mar. 19, 2020

(30) Foreign Application Priority Data
Sep. 18, 2018    (KR) .......................... 10-2018-0111483

(51) Int. Cl.
*G06F 3/044*    (2006.01)
(52) U.S. Cl.
CPC .. *G06F 3/0446* (2019.05); *G06F 2203/04111* (2013.01); *G06F 2203/04112* (2013.01)
(58) Field of Classification Search
CPC .... G06F 3/0443; G06F 3/0446; G06F 3/0448; G06F 2203/04111; G06F 2203/04112; G06F 2203/04103
See application file for complete search history.

(56) References Cited

U.S. PATENT DOCUMENTS

| 10,037,109 B2* | 7/2018 | Yashiro | G06F 3/044 |
| 10,095,339 B1* | 10/2018 | Tsai | B32B 15/04 |
| 10,459,592 B2* | 10/2019 | Tai | G06F 3/047 |
| 2014/0076612 A1* | 3/2014 | Kuriki | G06F 3/041 |
| | | | 174/250 |
| 2014/0332262 A1* | 11/2014 | Yoshiki | H05K 1/0274 |
| | | | 174/264 |
| 2015/0109259 A1* | 4/2015 | Hong | G06F 3/0436 |
| | | | 345/175 |
| 2016/0034081 A1* | 2/2016 | Ichiki | H05K 1/115 |
| | | | 345/173 |
| 2016/0299630 A1* | 10/2016 | Park | G06F 3/044 |

FOREIGN PATENT DOCUMENTS

KR    10-2014-0092366 A    7/2014

* cited by examiner

*Primary Examiner* — Kwang-Su Yang
(74) *Attorney, Agent, or Firm* — The PL Law Group, PLLC

(57) ABSTRACT

A touch sensor includes a substrate layer, sensing electrodes on the substrate layer, and optical compensation patterns. The sensing electrodes include electrode lines therein which extend in different directions to cross each other. The sensing electrodes are defined by separation regions at which portions of the electrode lines are cut. The optical compensation patterns are disposed at a different level or a different plane from that of the sensing electrodes. The optical compensation pattern at least partially fills the separation regions in a planar view. Optical properties of the touch sensor are improved by the optical compensation pattern, and visibility of electrodes is prevented.

13 Claims, 10 Drawing Sheets

TOUCH SENSOR HAVING SENSING ELECTRODES AND OPTICAL COMPENSATION PATTERNS AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2018-0111483 filed on Sep. 18, 2018 in the Korean Intellectual Property Office (KIPO), the entire disclosure of which is incorporated by reference herein.

BACKGROUND

1. Field

The present invention relates to a touch sensor and an image display device including the same. More particularly, the present invention relates to a touch sensor including sensing electrode patterns and an image display device including the same.

2. Description of the Related Art

As information technologies are being developed, various demands in display devices having thinner dimension, lightweight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

As a resolution of the display device is increased to a quad-high definition (QHD) level, an ultra-high definition (UHD) level, etc., a high resolution of the touch sensor may be also needed. Accordingly, a critical dimension and a pitch of sensing electrodes included in the touch sensor may be decreased.

The touch sensor may be stacked on a display panel, and an image quality of the display device may be deteriorated when the sensing electrodes of the touch sensor are viewed by a user. Further, a moiré phenomenon may be caused when the sensing electrode overlaps electrodes or wirings of the display panel.

For example, as disclosed in Korean Patent Application Publication No. 2014-0092366, various image display devices combined with a touch screen panel including a touch sensor has been developed recently. However, demands of a touch sensor or a touch panel having improved compatibility with the image display device are continuously increasing.

SUMMARY

According to an aspect of the present invention, there is provided a touch sensor having improved optical property and electrical reliability.

According to an aspect of the present invention, there is provided a window stack structure and an image display device including the touch sensor that has improved optical property and electrical reliability The above aspects of the present inventive concepts will be achieved by the following features or constructions:

(1) A touch sensor, comprising: a substrate layer; sensing electrodes on the substrate layer, the sensing electrodes including electrode lines therein which extend in different directions to cross each other, the sensing electrodes being defined by separation regions at which portions of the electrode lines are cut; and optical compensation patterns disposed at a different level or a different plane from that of the sensing electrodes, the optical compensation pattern at least partially filling the separation regions in a planar view.

(2) The touch sensor according to the above (1), wherein the optical compensation pattern entirely fills the separation region in the planar view.

(3) The touch sensor according to the above (2), wherein the separation region is filled with a whole of the optical compensation pattern or a portion of the optical compensation pattern in the planar view.

(4) The touch sensor according to the above (2), wherein the sensing electrodes have a mesh structure that includes a plurality of unit cells defined by the electrode lines neighboring each other and extending in different directions to cross each other.

(5) The touch sensor according to the above (4), wherein the separation region is defined as a region at which at least one vertex or at least one side of the unit cell is cut.

(6) The touch sensor according to the above (5), wherein the optical compensation pattern has a shape of a cross, a cut wavy line or a bar-pattern.

(7) The touch sensor according to the above (4), wherein the unit cell includes a plurality of curved lines selected from a sine curve, a cosine curve, a conic section, a catenary, a curve of pursuit, a cycloid, a trochoid or a cardioid.

(8) The touch sensor according to the above (4), wherein a boundary of the unit cell includes a plurality of water waves which have the same length corresponding to one period.

(9) The touch sensor according to the above (8), wherein the boundary of the unit cell consists of the water waves.

(10) The touch sensor according to the above (1), wherein the sensing electrodes includes: first sensing electrodes arranged along a first direction parallel to a top surface of the substrate layer; and second sensing electrodes arranged along a second direction parallel to the top surface of the substrate layer, the first direction and the second direction being perpendicular to each other, wherein the first sensing electrode and the second sensing electrode are separated from each other by the separation regions.

(11) The touch sensor according to the above (10), further comprising: a bridge electrode electrically connecting the first sensing electrodes neighboring in the first direction to each other; and a connecting portion by which the second sensing electrodes neighboring in the second direction are connected to each other.

(12) The touch sensor according to the above (11), wherein the connecting portion is integrally connected to the second sensing electrodes, and the bridge electrode is disposed over the connecting portion or under the connecting portion to cross the connecting portion.

(13) The touch sensor according to the above (12), wherein the bridge electrode and the optical compensation pattern are disposed at the same level or at the same plane.

(14) The touch sensor according to the above (13), further comprising an insulation layer partially covering the sensing electrodes, wherein the bridge electrode is insulated from the second sensing electrodes on the insulation layer to connect the neighboring first sensing electrodes.

(15) The touch sensor according to the above (13), further comprising an insulation layer partially covering the bridge electrode, wherein the sensing electrodes are disposed on the insulation layer, and the neighboring first sensing electrodes are electrically connected via the bridge electrode while being insulated from the second sensing electrodes.

(16) An image display device, comprising: a display panel; and the touch sensor according to any one of the above (1) to (15) on the display panel.

(17) The image display device according to the above (16), further comprising an adhesive layer combining the display panel and the touch sensor with each other.

In a touch sensor according to exemplary embodiments as described above, a sensing electrode may include a plurality of electrode lines, and an optical compensation pattern superimposed over a separation region or a cut area of the electrode lines at an upper level of the sensing electrode. The optical compensation pattern may fill the separation region from a direction of a viewer, and thus a visibility of electrodes due to an electrode arrangement deviation may be reduced or avoided. Further, the optical compensation pattern may be formed at the upper level or a lower level of the sensing electrode, and thus may be formed without a patterning limitation of the sensing electrode and a dimension of the optical compensation pattern may be decreased.

The sensing electrode may include unit cells defined by the electrode lines, and sides of a boundary of the unit cell may have the same water wave form. The unit cells may be regularly repeated so that the visibility of electrodes and a moiré phenomenon may be effectively reduced.

DETAILED DESCRIPTION

According to exemplary embodiments of the present invention, there is provided a touch sensor which includes sensing electrodes including a plurality of electrode lines therein, and an optical compensation pattern disposed at an upper level or a lower level of the sensing electrodes so that visibility of electrodes may be reduced or suppressed. Further, an image display device including the touch sensor is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

In the accompanying figures, two directions parallel to a top surface of a touch sensor or a substrate layer 105 and crossing each other may be designated as a first direction and a second direction. For example, the first direction and the second direction are perpendicular to each other.

Figure 1:
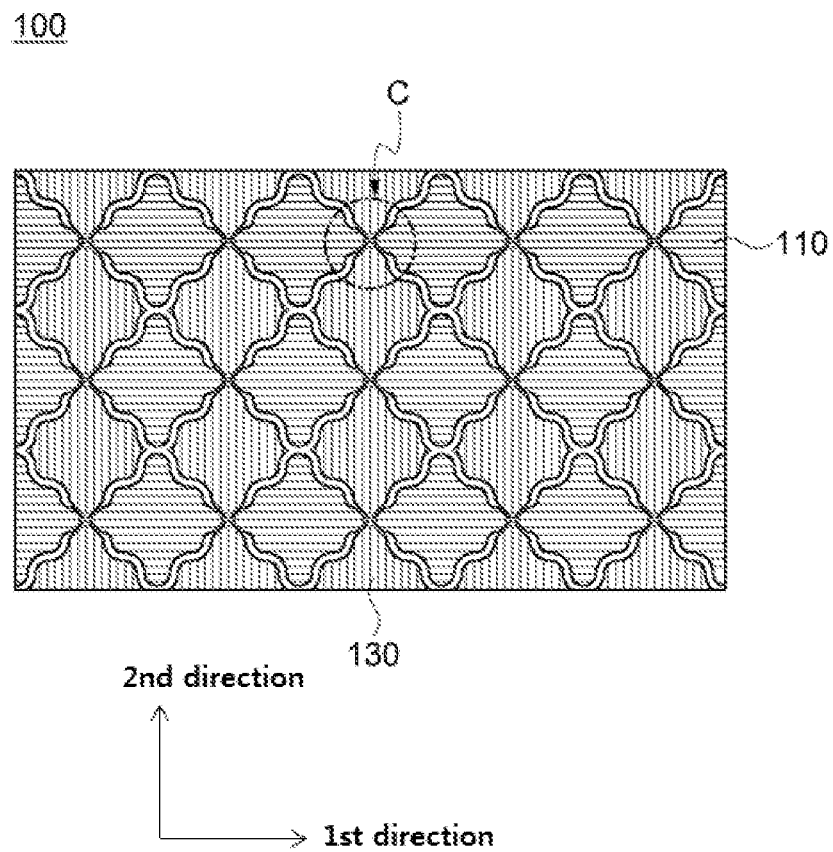
FIGS. 1 and 2 are a top planar view and a cross-sectional view, respectively, illustrating a schematic construction of a touch sensor in accordance with exemplary embodiments.
Figure 2:
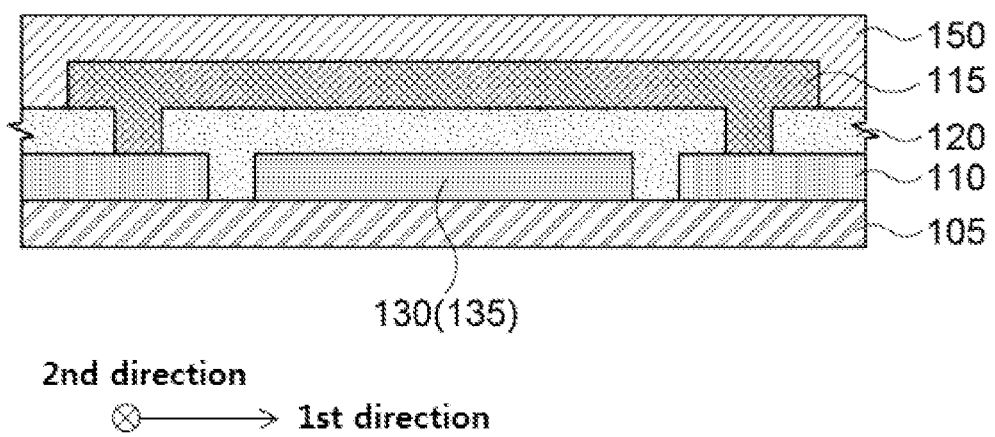

FIGS. 1 and 2 are a top planar view and a cross-sectional view, respectively, illustrating a schematic construction of a touch sensor in accordance with exemplary embodiments. For example, FIG. 2 is a cross-sectional view at an intersection region C designated in FIG. 1. FIG. 2 illustrates an example of a touch sensor having a top-bridge construction.

Referring to FIGS. 1 and 2, a touch sensor 100 may include the substrate layer 105 and sensing electrodes 110 and 130 arranged on the substrate layer 105.

The substrate layer 105 may include a film-type substrate serving as a base layer for forming the sensing electrodes 110 and 130, or an object on which the sensing electrodes 110 and 130 are formed. In some embodiments, the substrate layer 105 may be a display panel on which the sensing electrodes 110 and 130 may be directly formed.

For example, the substrate layer 105 may include a substrate or a film material commonly used in a touch sensor. For example, the substrate layer 105 may include glass, polymer and/or an inorganic insulation material. The polymer may include, e.g., cyclo olefin polymer (COP), polyethylene terephthalate (PET), polyacrylate (PAR), polyether imide (PEI), polyethylene naphthalate (PEN), polyphenylene sulfide (PPS), polyallylate, polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc. The inorganic insulation material may include, e.g., silicon oxide, silicon nitride, silicon oxynitride, a metal oxide, etc.

A layer or a film member in an image display device to which the touch sensor is applied may also serve as the substrate layer 105. For example, an encapsulation layer or a passivation layer included in the display panel may serve as the substrate layer 105.

The sensing electrodes 110 and 130 may include first sensing electrodes 110 and second sensing electrodes 130. For example, the sensing electrodes 110 and 130 may be arranged to be operated by a mutual capacitance type.

The first sensing electrodes 110 may be arranged along the first direction. Each first sensing electrode 110 may have an island pattern shape, and the first sensing electrodes 110 neighboring in the first direction may be electrically connected to each other by a bridge electrode 115.

Accordingly, a first sensing electrode row extending in the first direction may be defined, and a plurality of the first sensing electrode rows may be arranged along the second direction.

The second sensing electrodes 130 may be arranged along the second direction. The second sensing electrodes 130 neighboring in the second direction may be connected to each other by a connecting portion 135. The second sensing electrodes 130 and the connecting portion 135 may be integrally connected to each other to be a substantially unitary member. In this case, the second sensing electrodes 130 and the connecting portion 135 may be formed by patterning the same conductive layer to be placed at the same layer or at the same level.

Accordingly, a second sensing electrode column extending in the second direction may be defined, and a plurality of the second sensing electrode columns may be arranged along the first direction.

The sensing electrodes 110 and 130 and/or the bridge electrode 115 may include a metal, a metal alloy, a metal wire or a transparent conductive oxide.

For example, the sensing electrodes 110 and 130 and/or the bridge electrode 115 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), or an alloy thereof (e.g., silver-palladium-copper (APC)). These may be used alone or in a combination thereof.

The sensing electrodes 110 and 130 and/or the bridge electrode 115 may include the transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the sensing electrodes 110 and 130 and/or the bridge electrode 115 may include a multi-layered structure including the transparent conductive oxide and the metal. For example, the sensing electrodes 110 and 130 and/or the bridge electrode 115 may have a triple-layered structure of a transparent conductive oxide layer—a metal layer—a transparent conductive oxide layer. In this case, a flexible property may be enhanced by the metal layer so that a resistance may be reduced and a signal transfer speed may be improved. Further, a resistance to corrosion and a transparency may be enhanced by the transparent conductive oxide layer.

As illustrated in FIG. 1, in some embodiments, boundaries of the sensing electrodes 110 and 130 may have a substantially wavy shape.

As illustrated in FIG. 2, an insulation layer 120 at least partially covering the first sensing electrodes 110 and the connecting portion 135 may be formed on the substrate layer 105. The bridge electrode 115 may be disposed on the insulation layer 120 such that the neighboring first sensing electrodes 110 may be electrically connected to each other via, e.g., contact holes formed in the insulation layer 120.

A passivation layer 150 for protecting the touch sensor may be formed on the insulation layer 120 and the bridge electrode 115.

The insulation layer 120 and/or the passivation layer 150 may include an inorganic insulation material such as silicon oxide, silicon nitride, etc., or an organic insulation material such as an acryl-based resin, a siloxane-based resin, etc.

Figure 3:
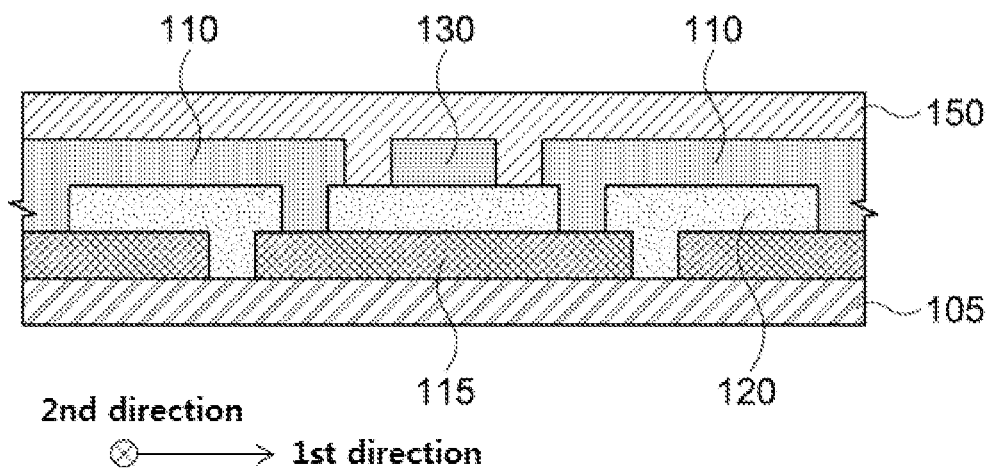
FIG. 3 is a cross-sectional view illustrating a schematic construction of a touch sensor in accordance with some exemplary embodiments.

FIG. 3 is a cross-sectional view illustrating a schematic construction of a touch sensor in accordance with some exemplary embodiments. For example, a touch sensor having a bottom-bridge construction is illustrated in FIG. 3. Detailed descriptions on elements and structures substantially the same as or similar to those illustrated in FIGS. 1 and 2 are omitted herein.

Referring to FIG. 3, the bridge electrode 115 may be disposed under the sensing electrodes 110 and 130. For example, the bridge electrode 115 may be formed on the substrate layer 105, and the insulation layer 120 may be formed on the substrate layer 105 to partially cover the bridge electrode 115. The insulation layer 120 may include a contact hole through which a top surface of the bridge electrode 115 may be partially exposed.

The second sensing electrodes 130 may be arranged along the second direction on the insulation layer 120 to be separated from the bridge electrode 115.

The first sensing electrodes 110 may be formed on the insulation layer to fill the contact holes and to be in contact with or electrically connected to the bridge electrode 115. Accordingly, the first sensing electrodes 110 neighboring in the first direction may be electrically connected via the bridge electrode 115 while being insulated from the second sensing electrodes 130.

Figure 4:
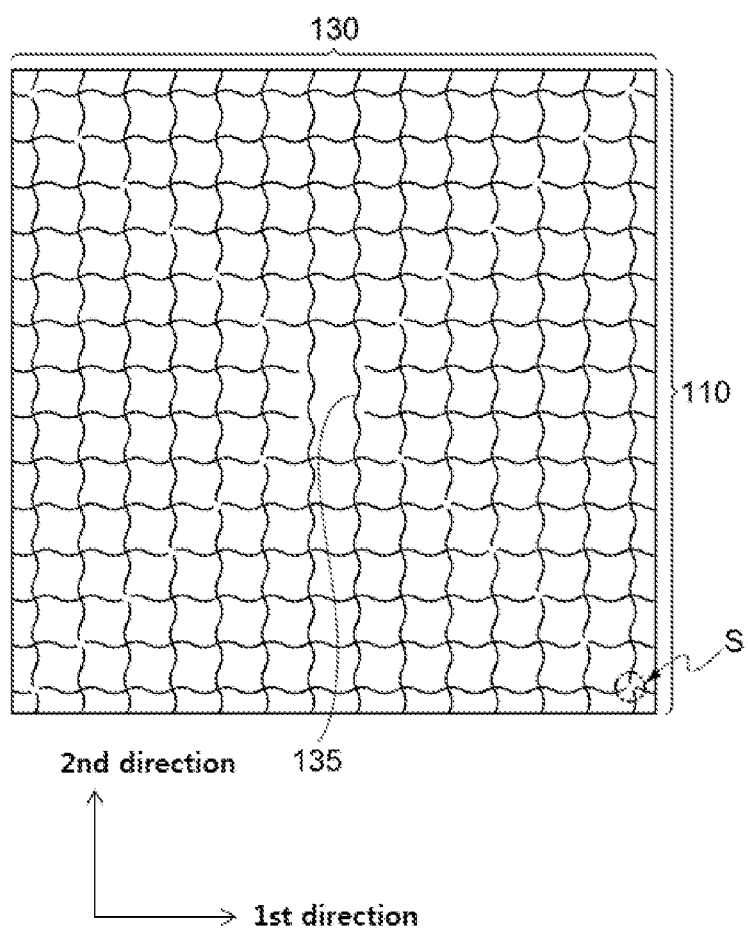
FIGS. 4 to 6 are schematic top planar views illustrating a pattern structure of sensing electrodes in accordance with exemplary embodiments.
Figure 5:
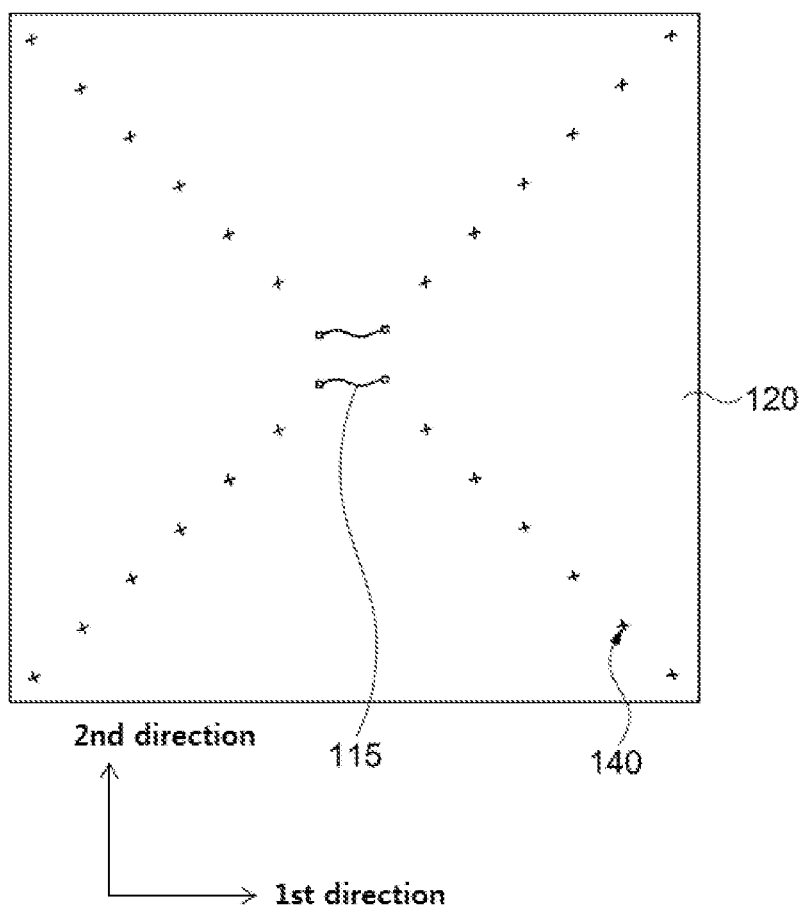
Figure 6:
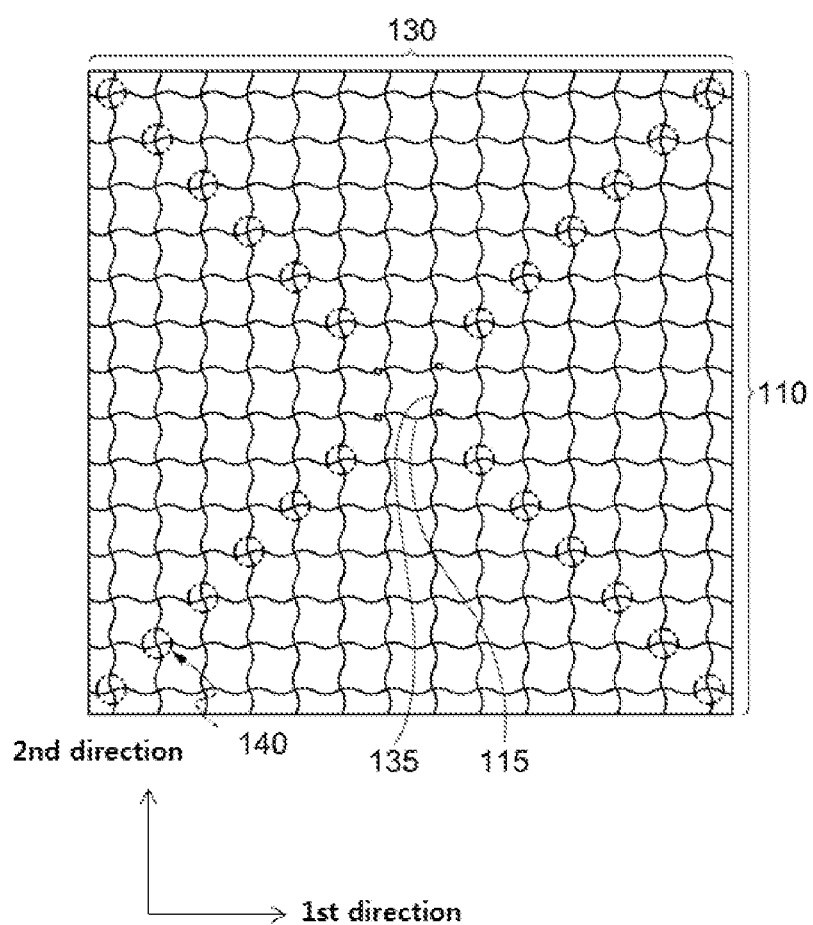

FIGS. 4 to 6 are schematic top planar views illustrating a pattern structure of sensing electrodes in accordance with exemplary embodiments. Specifically, FIG. 4 illustrates a pattern structure of the sensing electrodes 110 and 130 at the intersection region C designated in FIG. 1. FIG. 5 selectively illustrates the bridge electrode 115 and an optical compensation pattern 140 disposed at a different layer or a different level from that of the sensing electrodes 110 and 130. FIG. 6 illustrates a combination of FIGS. 4 and 5 in the same planar view.

Referring to FIG. 4, a pair of the first sensing electrodes 110 and a pair of the second sensing electrodes 130 may be disposed at the intersection region C of FIG. 1, and the pair of the second sensing electrodes 130 may be integrally connected with the connecting portion 135. The pair of the first sensing electrodes 110 may be spaced apart from each other in the first direction with respect to the connecting portion 135.

As illustrated in FIG. 4, the first sensing electrode 110 and the second sensing electrode 130 may each include a mesh structure defined by electrode lines crossing each other along the first and second directions. For example, the electrode lines may include first electrode lines extending in the first direction and second electrode lines extending in the second direction.

For example, two neighboring second electrode lines extending in the second direction and two neighboring first electrode lines extending in the first direction may cross each other to define a unit cell. A plurality of the unit cells may be repeatedly arranged to define the mesh structure.

A shape of the mesh structure will be described in more detail with reference to FIGS. 10 to 14 below.

A conductive layer having the mesh structure shape may be formed, and then separation regions S may be formed so that the first sensing electrode 110 and the second sensing electrode 130 may be electrically insulated or separated from each other.

In exemplary embodiments, intersecting points of the electrode lines or portions around vertices of the unit cells may be cut to form the separation regions S. For example, the separation regions S may be repeated along diagonal directions relative to the first direction and the second direction so that the first sensing electrode 110 and the second sensing electrode 130 may be divided to form boundaries.

As illustrated in FIG. 4, the separation regions of the electrode lines may be omitted at an area where two neighboring second sensing electrodes 130 are adjacent to each other, and the connecting portion 135 may be defined by at least one electrode line that may not be cut and may extend in the second direction.

Referring to FIG. 5, for example, the bridge electrode 115 may include at least one cut pattern from an electrode line having substantially the same shape as that of the electrode lines extending in the first direction as illustrated in FIG. 4. In an embodiment, the bridge electrode 115 may include at least two cut patterns.

In exemplary embodiments, the optical compensation pattern 140 may be disposed at an upper level or a lower level of the sensing electrodes 110 and 130. As illustrated in FIG. 5, the optical compensation pattern 140 may be disposed at the same level or the same plane as that of the bridge electrode 115.

In an embodiment, as illustrated in FIG. 2, the bridge electrode 115 may be disposed on the insulation layer 120, and the optical compensation pattern 140 may be disposed on the insulation layer 120 together with the insulation layer 120. In an embodiment, as illustrated in FIG. 3, the bridge electrode 115 may be disposed on the substrate layer 105, and the optical compensation pattern 140 may be disposed on the substrate layer 105 together with the bridge electrode 115. In this case, the sensing electrodes 110 and 130 may be disposed on the insulation layer 120 and may be disposed over the optical compensation pattern 140 and the bridge electrode 115.

The optical compensation pattern 140 may have a shape substantially the same as that of a cut portion of the electrode lines at the separation region S. In an embodiment, the optical compensation pattern 140 may have a substantially cross-shape as illustrated in FIG. 5.

Referring to FIG. 6, the optical compensation pattern 140 may be superimposed over the separation region S in a planar view as designated by a dotted circle. The bridge electrode 115 may be disposed over the connecting portion 135 or under the connecting portion 135 to cross the connecting portion 135 in the planar view.

A vacancy at the separation region S may be at least partially filled or covered with the optical compensation pattern 140 in the planar view. In exemplary embodiments, the separation region S may be substantially fully filled with the optical compensation pattern 140 in the planar view.

In an embodiment, the optical compensation pattern 140 may have a size substantially the same as that of the separation region S. In this case, the separation region S may be substantially fully filled with a whole of the optical compensation pattern 140 in the planar view.

In an embodiment, the optical compensation pattern 140 may have a size greater than that of the separation region S. In this case, the separation region S may be substantially fully filled with a partial portion of the optical compensation pattern 140 in the planar view.

As illustrated in FIG. 6, the separation regions S may be filled with the optical compensation patterns 140 in the planar view so that the electrode lines included in the sensing electrodes 110 and 130 may be viewed as a continuous and seamless shape when the touch sensor is observed in the planar view, and thus the separation regions S may not be specified or divided.

Therefore, changes of a reflectivity, a refractive index, a color sense, a pattern shape, etc., at the separation region S may be prevented or reduced so that an electrode visibility at the separation region S may be also prevented or reduced.

The optical compensation pattern 140 may be individually formed at a different level or a different plane from that of the sensing electrodes 110 and 130. Thus, a dimension or an area of the separation region S may be decreased, and the electrode visibility may be prevented more effectively.

Figure 7:
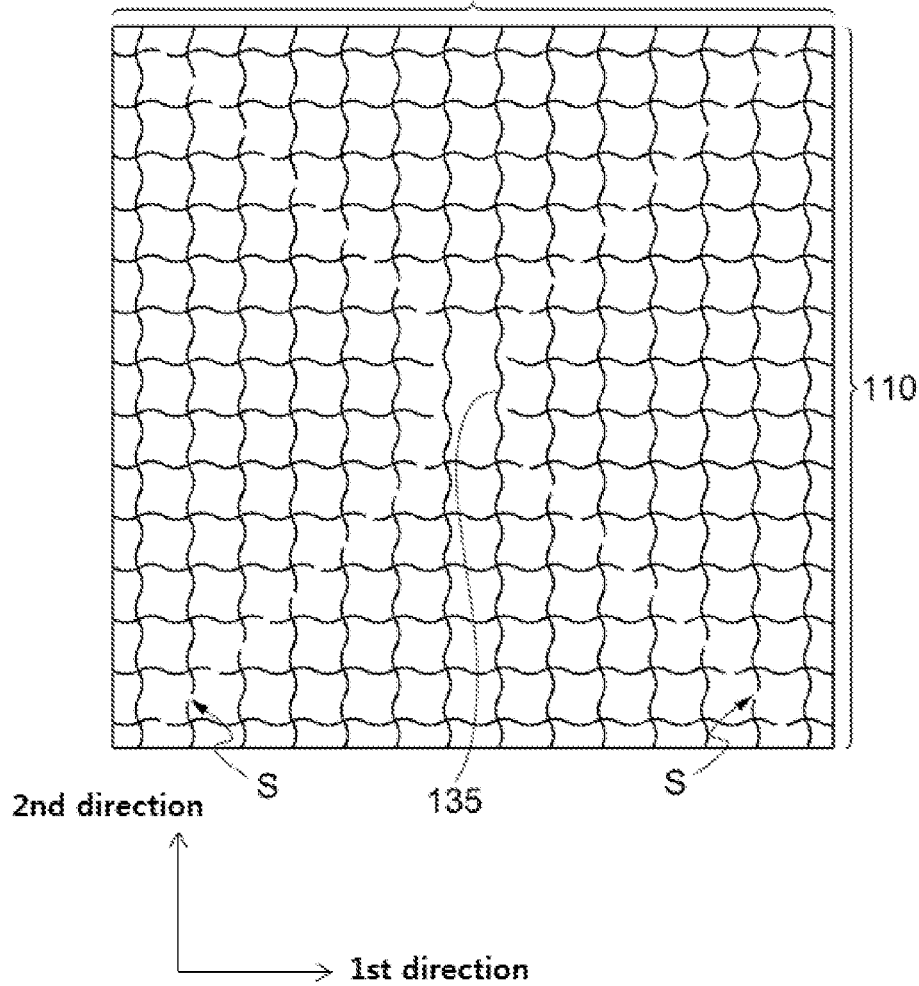
FIGS. 7 to 9 are schematic top planar views illustrating a pattern structure of sensing electrodes in accordance with some exemplary embodiments.
Figure 8:
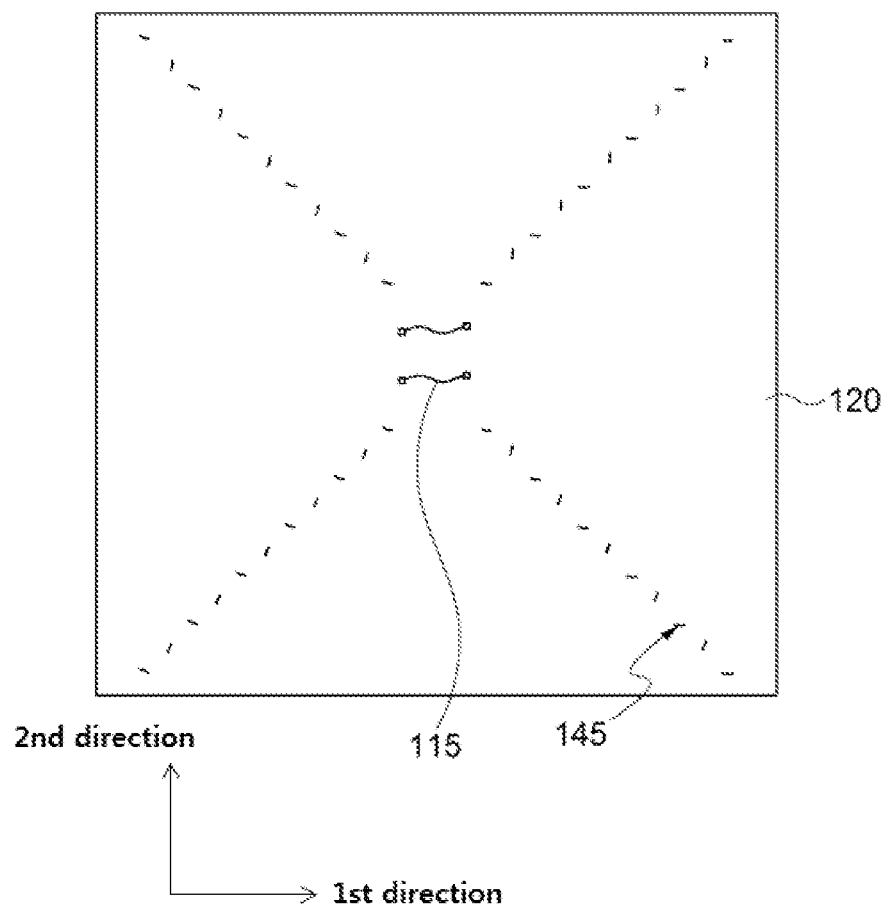
Figure 9:
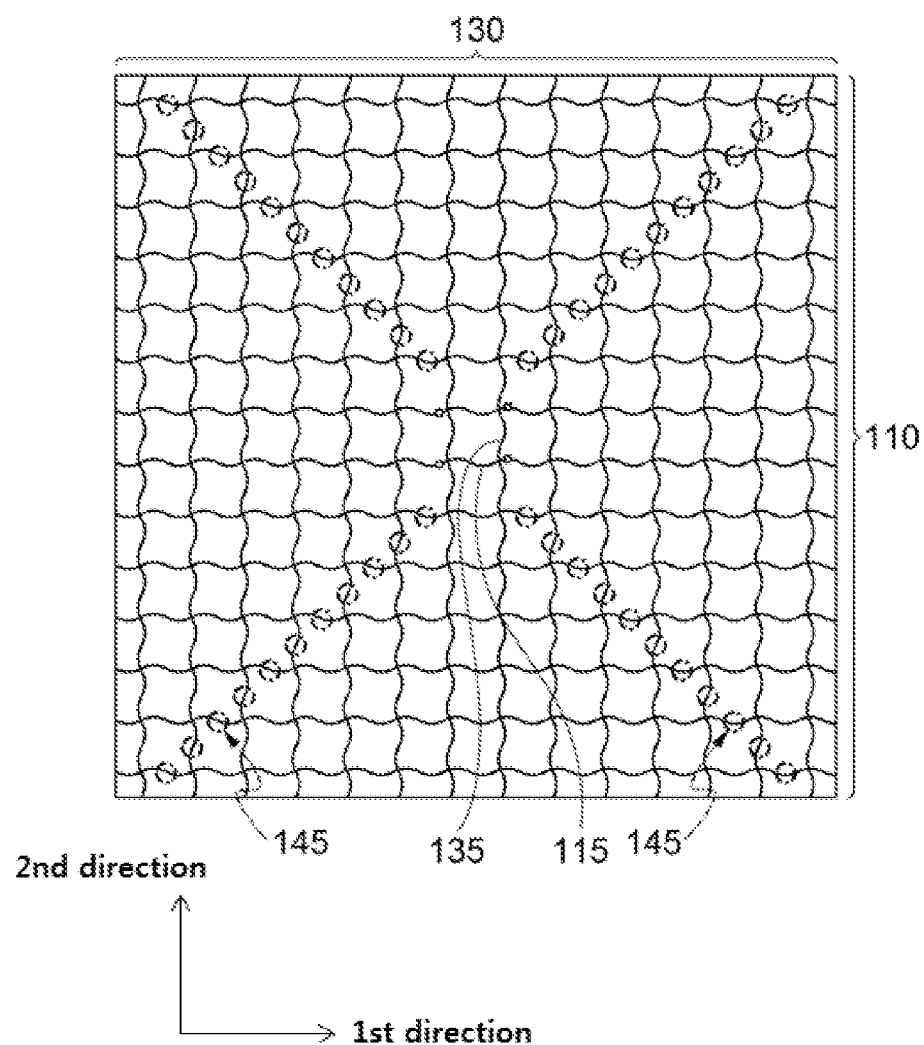

FIGS. 7 to 9 are schematic top planar views illustrating a pattern structure of sensing electrodes in accordance with some exemplary embodiments.

Referring to FIG. 7, at least one side of the unit cell included in the mesh structure may be cut to form the separation region S. For example, portions of the electrode lines that may meet two diagonal lines relative to the first direction and the second direction may be cut to define the separation regions S.

In an embodiment, one first electrode line and one second electrode line included in the unit cell which may meet the diagonal line may be cut to form the separation regions S.

Referring to FIG. 8, an optical compensation pattern 145 that may have a shape substantially the same as that of a portion cut from the separation region S may be formed. In an embodiment, the optical compensation pattern 145 may have a cut wavy line or a bar pattern shape. As described above, the optical compensation patterns 145 may be arranged on the same layer or the same plane as that of the bridge electrode 115.

Referring to FIG. 9, the separation region S may be substantially filled with the optical compensation pattern 145 (designated by a dotted circle) from a planar view. The bridge electrode 115 may be disposed over the connecting portion 135 or under the connecting portion 135 to cross the connecting portion 135 in the planar view.

As described above, the vacancies at the separation regions S may be substantially completely filled or covered by the optical compensation patterns 145 from the planar view. Thus, an electrode pattern structure of the touch sensor may include a substantially seamless mesh structure without cut portions when observed from the planar view.

FIGS. 10 to 14 are schematic top planar views illustrating shapes of mesh structures and unit cells included in sensing electrodes in accordance with exemplary embodiments.

Figure 10:
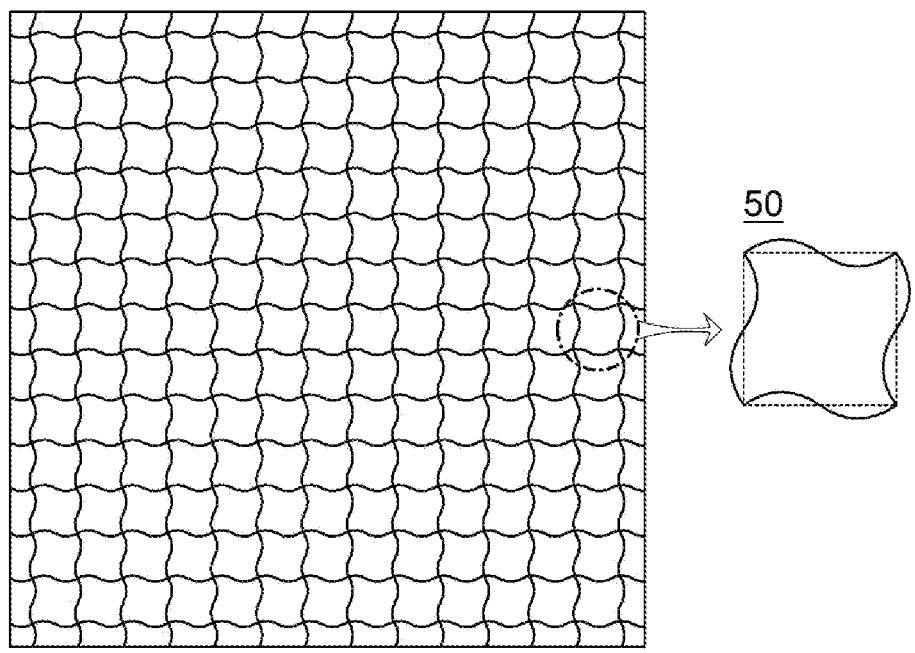
FIGS. 10 to 14 are schematic top planar views illustrating shapes of mesh structures and unit cells included in sensing electrodes in accordance with exemplary embodiments.

Referring to FIG. 10, the sensing electrode may include the mesh structure as described with reference to FIG. 4. A unit cell 50 included in the mesh structure may include a plurality of curved lines. For example, the curved line may include a sine curve, a cosine curve, a conic section, a catenary, a curve of pursuit, a cycloid, a trochoid, a cardioid, etc.

In some embodiments, the unit cell 50 may have a shape modified from an imaginary rectangle designated by dotted lines, a side of which is transformed into a water wave corresponding to one period.

In an embodiment, the unit cell 50 may consist of the water waves of the same waveform, and the unit cells 50 may be repeated to form the mesh structure.

As described above, the mesh structure may be defined by the water waves having the same waveform so that a spatial frequency generated from the electrode lines may be normalized or equalized. Thus, electrode visibility due to a spatial frequency deviation generated when cells or electrode lines having different shapes are included may be efficiently prevented.

Further, the mesh structure of the touch sensor may be defined by the water waves so that a moiré phenomenon caused by regular overlap of the touch sensor with wirings and electrodes included in a display panel may be effectively reduced or avoided.

Figure 11:
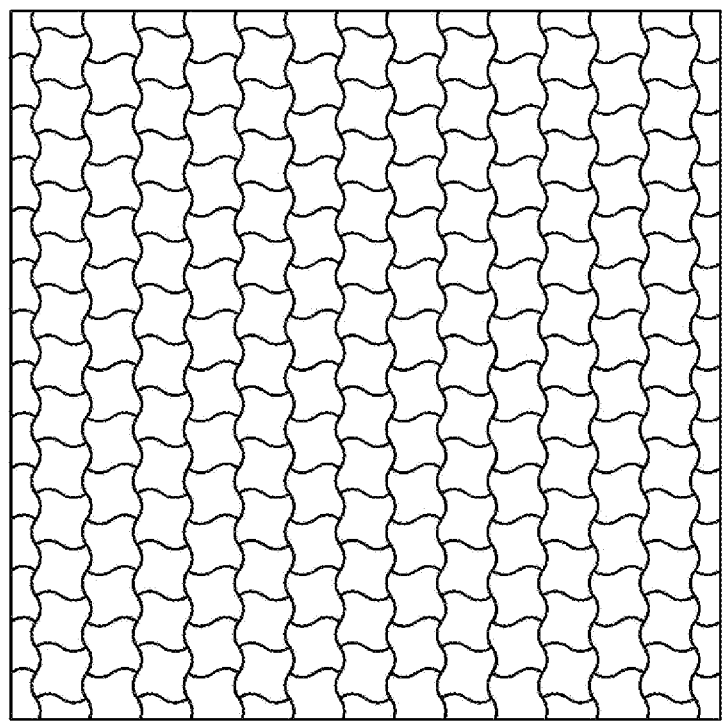

Referring to FIG. 11, the unit cells 50 of FIG. 10 may be repeated in a zigzag arrangement to form the mesh structure of the sensing electrode. Accordingly, the moiré phenomenon by the overlap with the display panel may be additionally reduced by a staggered arrangement of the unit cells 50.

Figure 12:
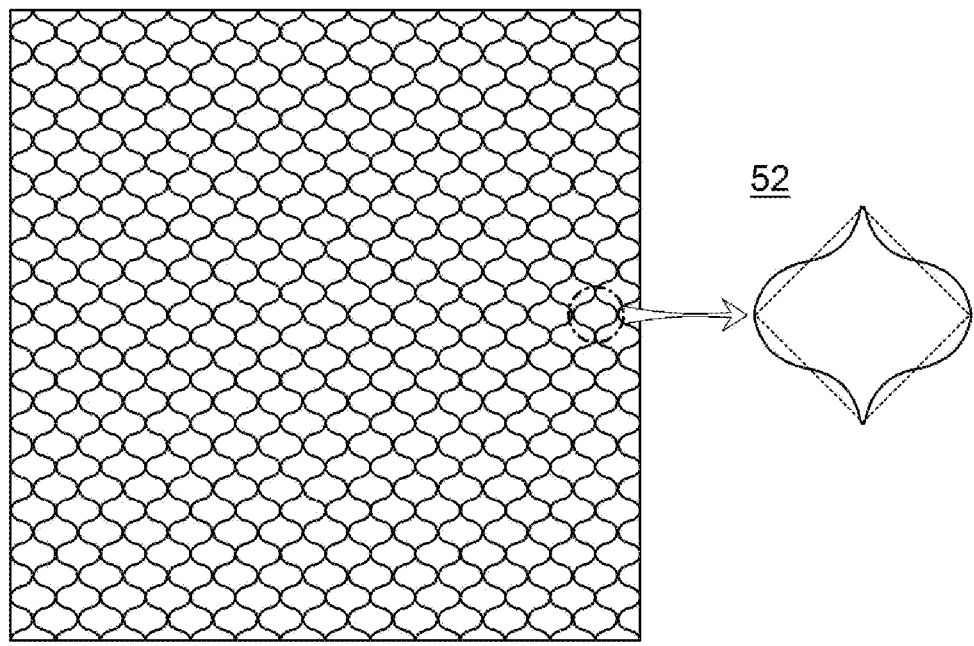

Referring to FIG. 12, a unit cell 52 may have a shape modified from an imaginary rhombus designated by dotted lines, a side of which is transformed into a water wave corresponding to one period, and the unit cell 52 may include four water waves having the same waveform.

Figure 13:
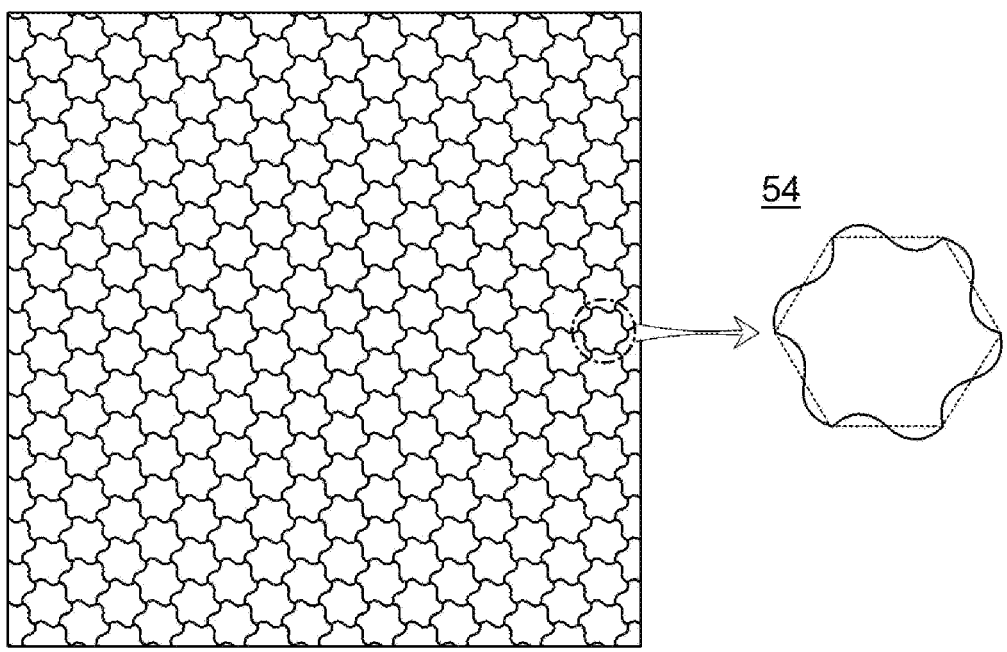

Referring to FIG. 13, a unit cell 54 may have a shape modified from an imaginary hexagon designated by dotted lines, a side of which is transformed into a water wave corresponding to one period, and the unit cell 54 may include six water waves having the same waveform.

Figure 14:
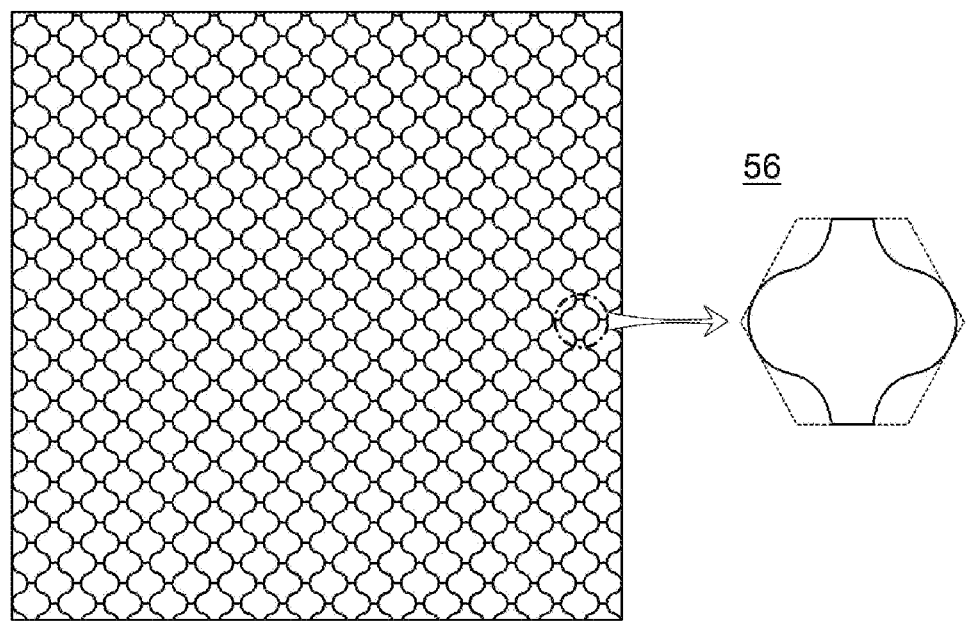

Referring to FIG. 14, a unit cell 56 may include a pair of water waves symmetrical to each other in an imaginary hexagon designated by dotted lines. Each water wave may have a length corresponding to one period.

According to exemplary embodiments of the present invention, an image display device including the touch sensor or the touch screen panel as described above is provided.

Figure 15:
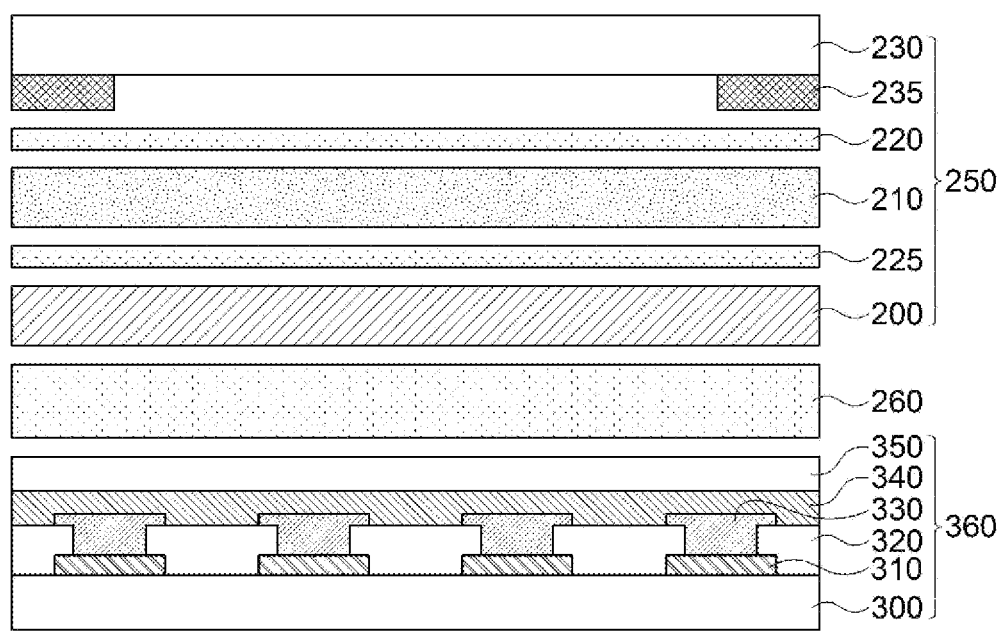
FIG. 15 is a schematic cross-sectional view illustrating a window stack structure and an image display device in accordance with exemplary embodiments.

FIG. 15 is a schematic cross-sectional view illustrating a window stack structure and an image display device in accordance with exemplary embodiments.

A window stack structure 250 may include a window substrate 230, a polarizing layer 210 and a touch sensor 200 according to exemplary embodiments as described above.

The window substrate 230 may include, e.g., a hard coating film. In an embodiment, a light-shielding pattern 235 may be formed on a peripheral portion of a surface of the window substrate 230. The light-shielding pattern 235 may include a color-printed pattern, and may have a single-layered or multi-layered structure. A bezel portion or a non-display region of the image display device may be defined by the light-shielding pattern 235.

The polarizing layer 210 may include a coating-type polarizer or a polarizing plate. The coating-type polarizer may include a liquid crystal coating layer that may include a cross-linkable liquid crystal compound and a dichroic dye. In this case, the polarizing layer 210 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The polarizing layer 210 may be directly attached to the surface of the window substrate 230 or may be attached via a first adhesive layer 220.

The touch sensor 200 may be included in the window stack structure 250 as a film or a panel. In an embodiment, the touch sensor 200 may be combined with the polarizing layer 210 via a second adhesive layer 225.

As illustrated in FIG. 15, the window substrate 230, the polarizing layer 210 and the touch sensor 200 may be sequentially positioned from a viewer's side. In this case, sensing electrodes of the touch sensor 200 may be disposed under the polarizing layer 210 so that electrode patterns may be effectively prevented from being seen by the viewer.

If the touch sensor 200 includes a substrate, the substrate may include, e.g., triacetyl cellulose, cycloolefin, cycloolefin copolymer, polynorbornene copolymer, etc., and may have an in-plane retardation of ±2.5 nm or less.

In an embodiment, the touch sensor 200 may be directly transferred to the window substrate 230 or the polarizing layer 210. In an embodiment, the window substrate 230, the touch sensor 200 and the polarizing layer 210 may be sequentially positioned from the viewer's side.

The image display device may include a display panel 360 and the window stack structure 250 disposed on the display panel 360.

The display panel 360 may include a pixel electrode 310, a pixel defining layer 320, a display layer 330, an opposing electrode 340 and an encapsulation layer 350 disposed on a panel substrate 300.

A pixel circuit including a thin film transistor (TFT) may be formed on the panel substrate 300, and insulation layer covering the pixel circuit may be formed. The pixel electrode 310 may be electrically connected to, e.g., a drain electrode of the TFT on the insulation layer.

The pixel defining layer 320 may be formed on the insulation layer, and the pixel electrode 310 may be exposed through the pixel defining layer 320 such that a pixel region may be defined. The display layer 330 may be formed on the pixel electrode 310, and the display layer 330 may include, e.g., a liquid crystal layer or an organic light emitting layer.

The opposing electrode 340 may be disposed on the pixel defining layer 320 and the display layer 330. The opposing electrode 340 may serve as, e.g., a common electrode or a cathode of the image display device. The encapsulation layer 350 may be disposed on the opposing electrode 340 to protect the display panel 360.

In some embodiments, the display panel 360 and the window stack structure 250 may be combined with each other through an adhesive layer 260. For example, a thickness of the adhesive layer 260 may be greater than each thickness of the first adhesive layer 220 and the second adhesive layer 225. A viscoelasticity of the adhesive layer 260 may be about 0.2 MPa or less at a temperature ranging from −20° C. to 80° C. In this case, a noise from the display panel 360 may be blocked, and an interface stress while being bent may be alleviated so that damages of the window stack structure 250 may be avoided. In an embodiment, the viscoelasticity of the adhesive layer 260 may be in a range from about 0.01 MPa to about 0.15 MPa.

The touch sensor 200 according to exemplary embodiments as described above may include sensing electrodes including unit cells and optical compensation patterns aligned on the sensing electrodes. Accordingly, degradation of an image quality from the display panel 360 may be prevented, and improved transmittance may be achieved.

What is claimed is:

1. A touch sensor, comprising:
a substrate layer;
sensing electrodes on the substrate layer, the sensing electrodes comprising first electrode lines in a first direction and second electrode lines crossing the first electrode lines and extending in a second direction different from the first direction;
separation regions formed by cutting portions of the first and second electrode lines to electrically insulate or separate the first sensing electrode lines and the second sensing electrode lines from each other; and
optical compensation patterns disposed at a different level or a different plane from that of the sensing electrodes, the optical compensation patterns at least partially filling the separation regions in a planar view,
wherein the sensing electrodes comprises:
first sensing electrodes arranged along the first direction parallel to a top surface of the substrate layer;
second sensing electrodes arranged along the second direction parallel to the top surface of the substrate layer and perpendicular to the first direction;
a bridge electrode electrically connecting the first sensing electrodes neighboring in the first direction to each other; and
a connecting portion integrally connected to the second sensing electrodes neighboring in the second direction at the same level as that of the second sensing electrodes,
wherein the first sensing electrodes and the second sensing electrodes are disposed at the same level or at the same plane to be separated from each other by the separation regions; and the bridge electrode is disposed over the connecting portion or under the connecting portion to cross the connecting portion, and the bridge electrode and the optical compensation patterns are disposed at the same level or at the same plane.

2. The touch sensor according to claim 1, wherein the optical compensation pattern entirely fills the separation regions in the planar view.

3. The touch sensor according to claim 2, wherein each of the separation regions is filled with a whole of the optical compensation pattern or a portion of the optical compensation pattern in the planar view.

4. The touch sensor according to claim 2, wherein the sensing electrodes have a mesh structure that includes a plurality of unit cells each defined by neighboring first electrode lines and neighboring second electrode lines.

5. The touch sensor according to claim 4, wherein the separation regions are each defined as a region at which at least one vertex or at least one side of a unit cell of the plurality of unit cell is cut.

6. The touch sensor according to claim 5, wherein the optical compensation pattern has a shape of a cross, a cut wavy line or a bar-pattern.

7. The touch sensor according to claim 4, wherein each of the unit cells includes a plurality of curved lines selected from a sine curve, a cosine curve, a conic section, a catenary, a curve of pursuit, a cycloid, a trochoid or a cardioid.

8. The touch sensor according to claim 4, wherein a boundary of each of the unit cells includes a plurality of water waves which have the same length corresponding to one period.

9. The touch sensor according to claim 8, wherein the boundary of each of the unit cells consists of the water waves.

10. The touch sensor according to claim 1, further comprising an insulation layer partially covering the first sensing electrodes,
wherein the bridge electrode is insulated from the second sensing electrodes on the insulation layer to connect the neighboring first sensing electrodes.

11. The touch sensor according to claim 1, further comprising an insulation layer partially covering the bridge electrode,
wherein the first sensing electrodes and the second sensing electrodes are disposed on the insulation layer, and the neighboring first sensing electrodes are electrically connected via the bridge electrode while being insulated from the second sensing electrodes.

12. An image display device, comprising:
a display panel; and
the touch sensor of claim 1 on the display panel.

13. The image display device according to claim 12, further comprising an adhesive layer combining the display panel and the touch sensor with each other.

* * * * *